United States Patent Office 3,322,863
Patented May 30, 1967

3,322,863
AMINOALKYL PHOSPHONATES AND
PREPARATION THEREOF
Warren J. Rabourn and Elvis E. Jones, Lake Jackson, Tex., assignors to The Dow Chemical Company, Midland, Mich., a corporation of Delaware
No Drawing. Filed Sept. 9, 1963, Ser. No. 307,285
7 Claims. (Cl. 260—944)

This invention relates to aminoalkyl phosphonate compounds, to the preparation of such compounds, and to the manufacture of useful compositions containing aminoalkyl phosphonates. More particularly, the present invention relates to aminoalkyl phosphonates (and plastic materials containing such aminoalkyl phosphonates (formed by the reaction of (1) an imidazolidine compound (containing a 5-membered saturated heterocyclic ring with two nitrogen atoms) and (2) a diester of phosphonic acid (such as a dialkyl phosphite).

The preparation of diethylaminomethyl phosphonic acid diethyl ester by the reaction of tetraethyl methylenediamine and diethyl phosphite is discussed in U.S. Patent 2,635,112 to Felds. In this process, however, the diamine molecule is cleaved during the reaction and diethylamine is obtained as a by-product.

The compounds of the invention are prepared according to the reaction:

(I)

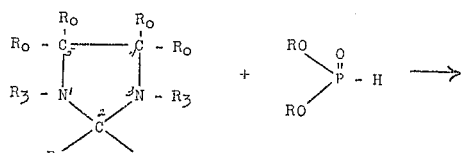

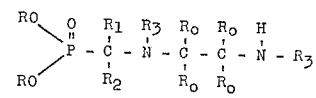

wherein R represents a lower alkyl group of from 1 to 4 carbon atoms (such as methyl, ethyl, n-propyl, i-propyl, n-butyl, i-butyl, sec.-butyl and t-butyl), each $R_3$ group may be the same or different and represents a hydrogen atom or an R group (preferably both $R_3$ groups are hydrogen atoms) and $R_0$, $R_1$ and $R_2$ are independently selected from the group consisting of the hydrogen atom, the phenyl group and an alkyl group of from 1 to 6 carbon atoms. Typical preparative reactions of dialkyl esters of phosphonic acid and substituted imidazolidines include the following:

(1) 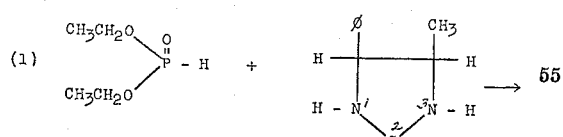

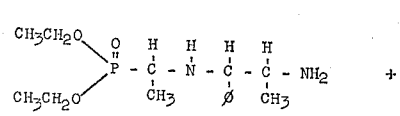

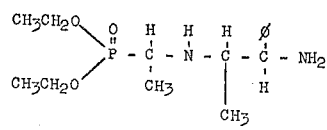

($\phi$ represents the phenyl group, —$C_6H_5$)

(2) 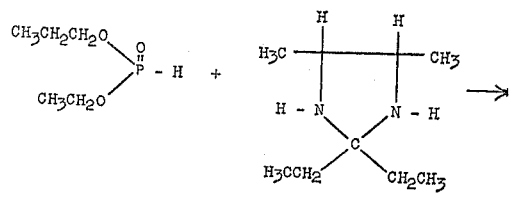

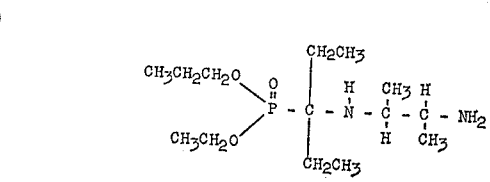

(3) 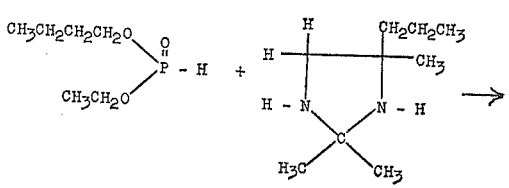

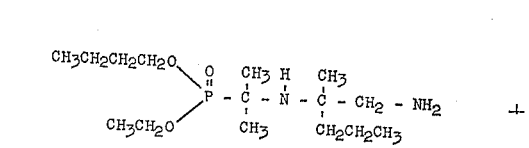

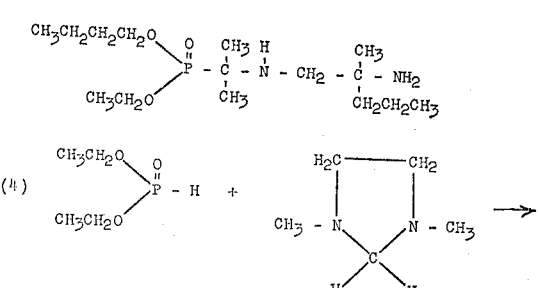

(4) 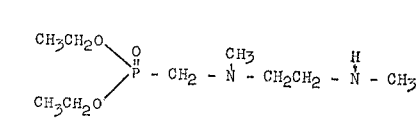

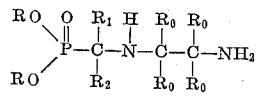

Other representative $R_1$ and $R_2$ groups include n-pentyl, i-pentyl and n-hexyl. A preferred subclass of compounds is represented by the formula $$RO\underset{RO}{\overset{O}{\diagdown}}P-\underset{R_2}{\overset{R_1}{C}}-N-\underset{R_0}{\overset{H}{C}}-\underset{R_0}{\overset{R_0}{C}}-NH_2$$

where R, $R_0$, $R_1$ and $R_2$ are as previously defined.

From the foregoing illustrative reactions, it is clear that unsymmetrically substituted imidazolidines (those which contain different substituents in the 4 and 5 positions) can lead to two different products, depending upon which nitrogen-carbon bond of the imidazolidine cleaves. Ordinarily, both products are formed and are separated from the reaction mixture by vacuum distillation. In a preferred embodiment of the invention, the imidazolidine reactant is such that all of the $R_0$ groups are the same, with at least one of $R_1$ and $R_2$ being a lower alkyl group, and both R groups of the phosphonic acid diester reactant being the same. Under these conditions, it does not matter which nitrogen-carbon bond cleaves.

The starting imidazolidine compounds may be prepared by several known methods. One convenient method involves the condensation of an alkylene diamine with an aldehyde, as shown by Acheson in "Heterocyclic Compounds" (1960) on pages 265–266. The 2,2-dialkylimidazolidines may be obtained by reacting the corresponding ketone with an ethylenediamine of the formula

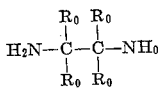

wherein $R_0$ is as previously defined in reaction (I).

The process by which the aminoalkyl phosphonate compounds are prepared is carried out by mixing stoichiometric amounts of the imidazolidine reactant and dialkyl ester of phosphonic acid

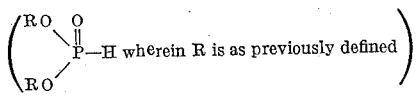

at temperatures of from about 5° to 65° C. (preferably from 10° to 50° C.) and then separating the product by distillation of the volatile components. While essentially equimolar amounts of dialkyl ester of phosphonic acid and imidazolidine compound are preferable, about a ten percent molar excess of either reactant may be tolerated in the reaction mixture without adversely affecting the course of the reaction. The process may be carried out at any convenient pressure up to about 10 or 20 atmospheres. The reaction is generally carried out at atmospheric pressure.

The aminoalkyl phosphonates of the invention are useful as reactive diluents for epoxy resins (e.g., diglycidyl ethers of Bisphenol A). When cured, the solid products obtained have excellent heat distortion values and are fire resistant. The aminoalkyl phosphonates are incorporated into the epoxy resins in quantities sufficient to give from about 0.25 percent to 10 percent of phosphorus based upon the total weight of the cured product. Amounts of phosphorus of from about 1.5 percent to 2.0 percent by weight are sufficient to impart self-extinguishing properties to the cured resins. (Self-extinguishing properties are evaluated according to ASTM D-635-56T.) Amounts of aminoalkyl phosphonate of from about 5 percent to 70 percent (preferably 20 to 50 percent) by weight (based on the total weight of the cured composition) may be used. Other examples of suitable epoxy resins with which the aminoalkyl phosphonates of this invention can be combined are given in U.S. Patent 3,078,271 (especially columns 5–14) to De Groote. Commercial resins such as "D.E.R. 332," obtained from The Dow Chemical Company, are very suitable. The mixtures of epoxy resin and aminoalkyl phosphonates form curable compositions which can be cured with conventional catalysts such as amines (trialkylamines, ethylenediamine, etc.) or with acids or anhydrides (such as phthalic acid or phthalic acid anhydride, Lewis acids, amides and the like). As shown in the examples, the aminoalkyl phosphonates themselves cause some curing of the epoxy resins. The epoxy resin composition may contain other reactive diluents as well as inert fillers and binding or cross-linking agents.

The following examples are submitted for the purpose of illustration only and are not to be construed as limiting the scope of the invention in any way.

*Example I*

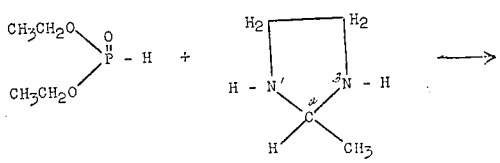

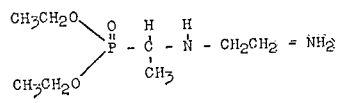

Into a reaction vessel equipped with a stirrer, thermometer and reflux condenser was added 172 grams (2 moles) of 2-methylimidazolidine and 276 grams (2 moles) of the diethyl ester of phosphonic acid (diethyl phosphite) at 25° C. Upon mixing, the temperature fell to 17° C. and then rose to 37° C. after one hour. The reaction was allowed to continue for an additional six hours, during which time the temperature varied from about 30° to 45° C. After removing the volatile components, the product

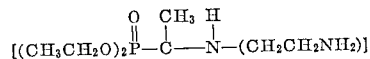

was analyzed and the index of refraction taken. The product was a light yellow, viscous oil soluble in petroleum ether and water. The index of refraction at 25° C. (Na D line) was 1.4603. Analysis of the product gave the following results (all figures are percent by weight).

|   | Calculated (Percent) | Found (Percent) |
|---|---|---|
| C | 42.85 | 43.44 |
| H | 9.44 | 9.08 |
| N | 12.49 | 11.19 |
| O | 21.41 | 21.79 |
| P | 13.81 | 14.50 |

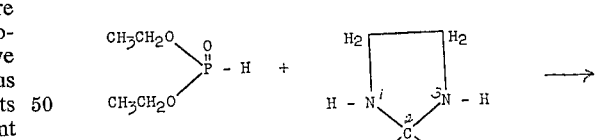

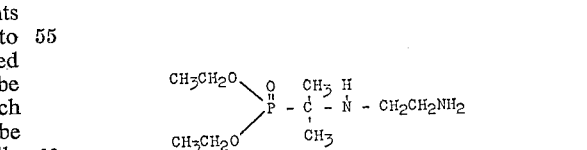

Into a reaction vessel equipped with a thermometer, stirrer and reflux condenser containing 1,100 grams (11 moles) of 2,2-dimethylimidazolidine was added dropwise 1.380 grams (10 moles) of the diethyl ester of phosphonic acid (diethyl phosphite). The temperature rose to 60° C. and the remainder of the diethyl ester of phosphonic acid was added after the temperature fell to about 30° C. After three hours, the temperature was 39.5° C. and after six hours, the temperature fell to 27° C. Volatile components were removed by vacuum distillation (0.5 mm.) and the product (the [1-(2-aminoethylamino)-1-methylethyl]diethyl ester of phosphonic acid) was filtered giving 2,267 grams of a clear, water white, slightly viscous product soluble in ethyl ether, acetone and water.

The refractive index at 25° C. (Na D line) was 1.4564. Analysis of the product was as follows:

|   | Calculated (Percent) | Found (Percent) |
|---|---|---|
| C | 45.37 | 45.27 |
| H | 9.73 | 9.17 |
| N | 11.76 | 11.62 |
| O | 20.14 | 20.64 |
| P | 13.00 | 13.3 |

The 2,2-dimethylimidazolidine was prepared by reacting 3 moles (174 grams) of acetone with 4 moles (240 grams) of ethylenediamine at about 60° C. for one-half hour. After removal of the water formed in the reaction, 2,2-dimethylimidazolidine was separated from the reaction mixture by distillation under reduced pressure.

from Example II were added to commercial epoxy resin (diglycidyl ether of Bisphenol A; epoxide equivalent weight of 178) formed by reacting two moles of epichlorohydrin with one mole of Bisphenol A. The mixtures were cured in the presence of methylene dianiline catalyst by mixing the constituents at 85 degrees C., curing at room temperature for 18 hours and then post-curing at 165 degrees C. for 4–5 hours. The products formed were self-extinguishing, had good heat distortion values and had excellent physical strength characteristics. The concentrations of reactive diluent in the epoxy resins as well as some of the important physical tests are summarized in Table II. In each composition, the total amount of epoxy resin to which the other ingredients were added amounted to 174 grams and the amount of methylene dianiline used was 34.2 grams.

TABLE II

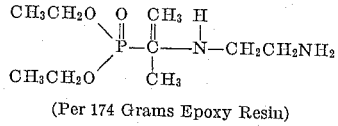

| Grams of— (Per 174 Grams Epoxy Resin) | Percent of Weight of P in Cured Composition | Heat Distortion (° F.) | Izod Impact Strength (ft.-lb.-/in.) | Compression Strength (p.s.i.) | Percent Elongation | Arc Resistance (Sec.) | Tensile Strength (p.s.i.) |
|---|---|---|---|---|---|---|---|
| (h) | 29.5 | 1.65 | 271 | 0.21 | 18,945 | 4.8 | 11 | 7,493 |
| (i) | 33.0 | 1.82 | 272 | 0.22 | 19,112 | 4.0 | 10 | 6,010 |
| (j) | 36.9 | 2.00 | 270 | 0.32 | 19,407 | 8.8 | 8 | 7,940 |
| (k) | 40.6 | 2.17 | 265 | 0.37 | 19,770 | 9.5 | 8 | 8,562 |

*Example III*

To an epoxy resin (diglycidyl ether of Bisphenol A with an epoxide equivalent weight of 178 formed by reacting about two moles of epichlorohydrin with one mole of Bisphenol A) was added varying amounts of the [1-(2-aminoethylamino)-1-methylethyl]diethyl ester of phosphonic acid from Example II. The epoxide equivalent weight is the molecular weight of the resin divided by the number of reactive epoxide groups in the molecule. The amounts of aminoalkyl phosphonate added and the tensile strength of the cured products are given in Table I. The resin was cured without an additional curing agent for 16 hours at room temperature, then post-cured for 2 hours at 120° C., in order to determine the optimum concentration of phosphonic acid ester to be used during the curing cycle (the theoretical equivalent weight based on reactive hydrogen atoms is ⅓ of the formula weight). For convenience, the actual equivalent weight was set at one-half of the formula weight, since at this proportion, optimum properties are obtained.

The heat distortion value is the temperature (° F.) at which the test specimen first begins to deform. Izod impact strength is a measure of the ability of a material to withstand a rapidly applied load and is the force required to break a notched test specimen using a freely swinging test pendulum. The values are expressed in foot-pounds per inch of notch. Compressive strength is the compression load in pounds at the yield point of a specimen divided by the cross-sectional area of resisting surface. Elongation measures the increase in length of a measured strip of material when stretched to the breaking point and is expressed in terms of percentage increase of the original length of the test specimen. Arc resistance is a measure of the resistance of the surface of a material to the passage of an electric arc when two point electrodes are placed upon two points on the same surface of material and is recorded as the lapsed time in seconds before the arc ceases to travel in the air and begins to travel along the surface of the test material.

TABLE I

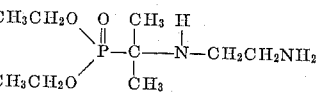

| Grams of— Combined With 174 Grams of Diglycidyl Ether of Bisphenol A | Percent Phosphorus in Cured Product | Percent Elongation | Tensile Strength (p.s.i.) |
|---|---|---|---|
| (a) | 71 | 3.85 | 261 | 26 |
| (b) | 79 | 4.15 | 131 | 87.7 |
| (c) | 87 | 4.44 | 39.3 | 112.3 |
| (d) | 95 | 4.69 | 136.7 | 112.4 |
| (e) | 102.7 | 4.94 | 95.6 | 167.0 |
| (f) | 110.6 | 5.18 | 87.1 | 189.2 |
| (g) | 118.5 | 5.38 | 41.6 | 230 |

*Example IV*

Varying amounts of

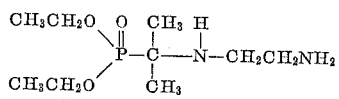

We claim as our invention:
1. A compound of the formula

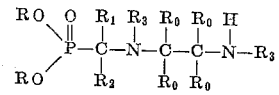

wherein each R is a lower alkyl group, each $R_3$ is independently selected from the group consisting of the hydrogen atom and a lower alkyl group, and each of $R_0$, $R_1$ and $R_2$ is independently selected from the group consisting of the hydrogen atom, the phenyl group and an alkyl group of from 1 to 6 carbon atoms.

2. A compound of the formula

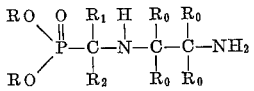

wherein each R is a lower alkyl group and each of $R_0$, $R_1$ and $R_2$ is independently selected from the group consisting of the hydrogen atom, the phenyl group and an alkyl group of from 1 to 6 carbon atoms.

3. A compound of the formula

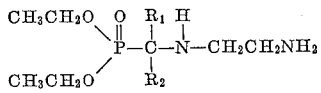

wherein $R_1$ and $R_2$ are each independently selected from the group consisting of the hydrogen atom, the phenyl group and an alkyl group of from 1 to 6 carbon atoms.

4. The compound:

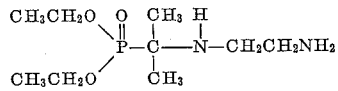

5. The compound:

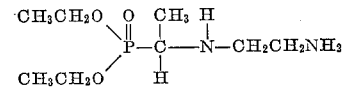

6. A process for the preparation of aminoalkyl phosphonates which comprises reacting at a temperature of 5–65° C. stoichiometric amounts of a di(lower alkyl) ester of phosphonic acid and an imidazolidine of the formula

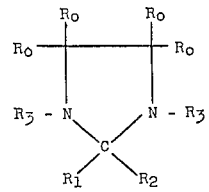

wherein each $R_3$ is independently selected from the group consisting of the hydrogen atom and a lower alkyl group and each of $R_0$, $R_1$ and $R_2$ is independently selected from the group consisting of the hydrogen atom, the phenyl group and an alkyl group of from 1 to 6 carbon atoms.

7. A process which comprises reacting at a temperature of 5–65° C. essentially equimolar amounts of the diethyl ester of phosphonic acid and an imidazolidine of the formula

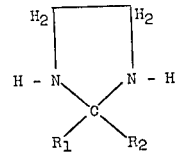

wherein $R_1$ and $R_2$ are independently selected from the group consisting of the hydrogen atom, the phenyl group and an alkyl group of from 1 to 6 carbon atoms.

No references cited.

CHARLES B. PARKER, *Primary Examiner.*

JOSEPH P. BRUST, *Examiner.*

BERNARD BILLIAN, *Assistant Examiner.*